(12) United States Patent
Ebbesen et al.

(10) Patent No.: US 9,551,325 B2
(45) Date of Patent: Jan. 24, 2017

(54) WIND TURBINE FLANGE CONNECTION

(71) Applicant: SIEMENS AKTIENGESELLSCHAFT, München (DE)

(72) Inventors: Henning Ebbesen, Skjern (DK); Akhilesh Shukla, Ikast (DK)

(73) Assignee: SIEMENS AKTIENGESELLSCHAFT (DE)

( * ) Notice: Subject to any disclaimer, the term of this patent is extended or adjusted under 35 U.S.C. 154(b) by 415 days.

(21) Appl. No.: 14/226,186

(22) Filed: Mar. 26, 2014

(65) Prior Publication Data
US 2014/0356184 A1 Dec. 4, 2014

(30) Foreign Application Priority Data
May 28, 2013 (EP) .................................. 13169501

(51) Int. Cl.
*F03D 11/04* (2006.01)
*F03D 1/00* (2006.01)

(52) U.S. Cl.
CPC ............... *F03D 11/04* (2013.01); *F03D 1/001* (2013.01); *F03D 13/20* (2016.05); *F03D 15/00* (2016.05); *F05B 2260/3011* (2013.01); *Y02E 10/722* (2013.01); *Y02E 10/726* (2013.01); *Y02E 10/728* (2013.01)

(58) Field of Classification Search
CPC .......... F03D 11/04; F03D 1/001; F03D 15/00; F03D 13/20; Y03E 10/722; Y02E 10/726; F05B 2260/3011
See application file for complete search history.

(56) References Cited

U.S. PATENT DOCUMENTS

| | | | | |
|---|---|---|---|---|
| 4,028,909 A | * | 6/1977 | Jancic et al. | F16D 1/02 285/2 |
| 6,155,513 A | * | 12/2000 | Smithson | B60R 22/46 242/383.2 |
| 7,282,808 B2 | * | 10/2007 | Shibata et al. | F16C 19/386 290/44 |
| 8,061,999 B2 | * | 11/2011 | Bagepalli et al. | F03D 1/003 415/123 |

(Continued)

FOREIGN PATENT DOCUMENTS

WO 2013042294 A1 3/2013

OTHER PUBLICATIONS

European Search Report dated Nov. 11, 2013; Application No. 13169501.7; Siemens Aktiengesellschaft; 6 pgs.

*Primary Examiner* — Kevin Lee
(74) *Attorney, Agent, or Firm* — Schmeiser Olsen & Watts LLP

(57) ABSTRACT

A wind turbine flange connection between a hub and a nacelle of the wind turbine, a wind turbine, a wind turbine hub and a wind turbine nacelle is provided. The hub of the wind turbine comprises a first flange and the nacelle of the wind turbine comprises a second flange. The first flange and the second flange are connected to each other by a number of connection means, to transfer forces between the first flange and the second flange. The first flange comprises a plurality of holes and the second flange comprises a plurality of holes corresponding to the holes in the first flange. Shear pins are arranged in the holes in the flanges to transfer rotational forces between the hub and the nacelle.

16 Claims, 6 Drawing Sheets

(56) References Cited

U.S. PATENT DOCUMENTS

2011/0142598 A1\* 6/2011 Andersen et al. ...... F03D 1/003
 415/122.1
2011/0250077 A1 10/2011 Pedersen
2011/0293357 A1 12/2011 Riisager et al.
2012/0183403 A1 7/2012 Elmose et al.

\* cited by examiner

WIND TURBINE FLANGE CONNECTION

CROSS-REFERENCE TO RELATED APPLICATIONS

This application claims priority to EP Application No. 13169501.7, having a filing date of May 28, 2013, the entire contents of which are hereby incorporated by reference.

FIELD OF TECHNOLOGY

The following relates to a wind turbine flange connection between the hub and the nacelle of the wind turbine, a wind turbine, a wind turbine hub and a wind turbine nacelle.

BACKGROUND

A wind turbine comprises a rotor with rotor blades and a hub. The hub of the wind turbine is connected to the nacelle of the wind turbine. The hub is connected to the main shaft of the wind turbine or to the rotor of an electrical generator at a direct driven wind turbine.

The hub is attached to the nacelle by a flange connection. The flange connection between the hub of a wind turbine and the nacelle comprises a flange at the hub of the wind turbine and a flange at the nacelle of the wind turbine The hub sided flange and the nacelle sided flange are connected together by bolts. The bolts press the flanges together to prevent any movement of one of the flanges in relation to the other flange.

During the operation of the wind turbine the wind interacts with the rotor blades of the wind turbine and rotates the rotor. Due to the wind and gusts in the wind varying loads and vibrations are induced into the rotor.

The flange connection transfers the rotation to the main shaft of the wind turbine or to the rotor of the electrical generator. In addition radial forces, axial forces and bending moments from the loads and vibrations are transferred from the hub to the nacelle.

As the development of the wind turbine advances to bigger rotor diameters, more and more loads and vibrations have to be transferred over the flange connection.

It is known to increase the number and diameter of the bolts in the flange connection to prevent movements between the two flanges.

This shows the disadvantage, that more and heavier bolts are needed in a wind turbine and more installation time is needed for tightening the bolts.

SUMMARY

Therefore, a first aspect relates to a wind turbine blade bearing. A second aspect relates to a wind turbine hub and nacelle. A third aspect relates to a wind turbine.

The aim of the invention is therefore to provide an improved flange connection between the hub and the nacelle of a wind turbine.

A wind turbine flange connection between a hub and a nacelle is disclosed. The hub of the wind turbine comprises a first flange and the nacelle of the wind turbine comprises a second flange.

The first flange and the second flange are connected to each other by a number of connection means, to transfer forces between the first flange and the second flange.

The first flange comprises a plurality of holes and the second flange comprises a plurality of holes corresponding to the holes in the first flange. Shear pins are arranged in the holes in the flanges to transfer rotational forces between the hub and the nacelle.

The hub of a wind turbine is connected to a nacelle by a flange connection. The flange of the hub and the flange of the nacelle are connected by a number of connection means. The connection means can be bolts going through holes in the flanges of the hub and the nacelle.

Rotor blades are connected to the hub of the wind turbine. During the operation of the wind turbine the wind interacts with the rotor blades and rotates the hub.

The rotation is transferred over the flange connection to the nacelle. Thus, axial forces, rotational forces and tilting moments are transferred from the hub to the nacelle.

The connection means press the flanges of the hub and the nacelle together so that a transfer of the forces is possible.

The first flange of the hub comprises a plurality of holes and a second flange of the nacelle comprises a plurality of holes corresponding to the holes of the first flange. The holes in the first flange and the holes in the second flange are arranged in a way that they correspond to each other when the flanges are connected.

Shear pins are arranged in the holes of the flanges to transfer rotational forces between the hub and the nacelle. The shear pins are arranged in the holes of the flanges in addition to the connection means.

The shear pins take shear forces, thus rotational forces can be transferred from the first flange to the second flange. Thus, the ability of the flange connection to transfer rotational forces is improved. Thus, higher rotational forces can be transferred over the flange connection. Thus, higher loads can be transferred over the flange connection. Thus, more rotational energy can be transferred from the rotor of the wind turbine to the generator of the wind turbine in the nacelle.

Thus, more electrical energy is produced in the wind turbine. More rotational energy can be transferred over the flange connection without increasing the size and thereby the mass of the flanges.

The holes in the first flange and/or the holes in the second flange to accommodate the shear pins are blind holes.

The shear pins are arranged in the holes in the first flange and/or the holes of the second flange before the first flange and the second flange are connected. The shear pins can't accidentally be pushed out of the holes during the operation of connecting the flanges.

Thus, the shear pins are fixed in their position during the connection and during the operation of the wind turbine.

In addition, the shear pins can be used as guiding means to assist during the operation of connecting the flanges. Thus, the first flange is guided along the shear pins in the holes to a suitable position in reference to the second flange, while the hub of the wind turbine is connected to the nacelle of the wind turbine. Thus, the shear pins facilitate as guiding means in addition. Thus, the installation of the hub of the wind turbine can be performed easier and quicker.

The shear pins are at least arranged in a sector along the first flange where the hub shows a lower stiffness or a high gradient in the stiffness.

The hub of a wind turbine shows a changing stiffness along the first flange due to the constructive form of the hub. Thus, the first flange shows higher and lower values of stiffness along its surface. Thus, sectors of lower stiffness or sectors of a high gradient in the stiffness occur along the first flange.

The shear pins are arranged in a sector along the first flange where the first flange shows a lower stiffness or higher gradient in the stiffness.

The shear pins assist to transfer rotational forces from the first flange to the second flange in a sector of a lower stiffness or a high gradient in the stiffness.

Thus, the ability of the sector with a lower stiffness or a high gradient in the stiffness to transfer forces over the flange connection is increased.

The hub comprises a connection area that is prepared to receive a rotor blade and the shear pins are arranged in a sector along the first flange close to the area for the connection of a rotor blade.

Rotor blades are connected to the hub of a wind turbine. Thus, the hub of the wind turbine comprises a connection area that is prepared to receive a rotor blade.

During the operation of the wind turbine, the wind interacts with the rotor blades and induces forces into the rotor blades. The forces are transferred to the hub of the wind turbine via the connection area. The hub of the wind turbine rotates due to the forces induced in the rotor blades.

The forces induced in the rotor blades are transferred via the hub to the nacelle of the wind turbine. The loads and forces to be transferred over the flange connection are not evenly distributed along the flanges. In the sector along the first flange that is close to the area for the connection of the rotor blades higher forces and loads have to be transferred.

The shear pins are arranged in a sector along the first flange close to the area of the connection of the rotor blades. Thus, the shear pins are arranged in a sector where higher forces and loads have to be transferred.

Thus, the shear pins assist to transfer higher forces and loads over the flange connection. Thus, higher forces and loads can be transferred over the flange connection without increasing the size of the flange connection and thereby the mass of the flanges.

The hub comprises an opening for service and maintenance purpose and the shear pins are arranged in a sector along the first flange close to the area of the opening.

The hub comprises an opening for service and maintenance purpose. This can be man-holes, to allow service personal to reach the outer surface of the hub from the inside of the hub. Or this can be openings in the connection area to connect the rotor blades to the hub that are used to reach the interior of the rotor blades.

Openings in the hub for service and maintenance purpose are through-going holes through the wall of the hub. Through-going holes through the wall of the hub influence the stiffness of the hub. Thus, openings for service and maintenance purpose in the hub influence the stiffness along the first flange.

Thus openings in the hub lead to a changing stiffness along the first flange or to a high gradient of the stiffness along the first flange. The shear pins are arranged in a sector along the first flange close to the area of the opening.

Thus the shear pins transfer rotational forces over the flange connection in the area of the opening. Thus the ability of the flange connection to transfer rotational forces in a sector close to the area of an opening is improved.

The shear pins are arranged in the area of the first flange adjacent to a man-hole in the hub.

A man-hole is a through-going opening in the wall of the hub that allows service personal to reach from the inside of the hub to the outside. Through-going holes in the wall of the hub lead to a lower stiffness or a high gradient in the stiffness of the hub in the area of the opening.

The shear pins improve the transfer of rotational forces over the flange connection. The shear pins are arranged in the area of the first flange adjacent to a man-hole in the hub.

Thus the shear pins assist to transfer rotational forces in an area of lower stiffness or high gradient in the stiffness along the first flange of the flange connection.

The shear pins are located in three sectors along the circumference of the first flange which each cover up to one sixth of the circumference of the first flange.

Most of today's wind turbines are equipped with three rotor blades. This leads to three areas to connect a rotor blade at the hub. Close to the area for connection of a rotor blade, the first flange of the hub shows a lower stiffness or a high gradient in the stiffness.

The shear pins transfer rotational forces over the flange connection from the first flange to the second flange. The shear pins are arranged in a sector along the first flange close to the area for the connection of the rotor blades.

Thus the shear pins are arranged in three sectors along the circumference of the first flange. Each of the sectors along the first flange covers up to one sixth of the circumference of the first flange.

Thus the sector of lower stiffness or a high gradient in the stiffness is covered. Thus the distribution of the shear pins is optimized.

The plurality of shear pins is mainly evenly distributed along the circumference of the first flange.

The shear pins transfer rotational forces from the first flange to the second flange. Thus the rotational forces are mainly evenly transferred from the first flange to the second flange along the circumference of the flange connection.

The flange connection comprises a circle of holes that are arranged and prepared in a way to receive the connection means and the shear pins are arranged radially outward of the circle of holes.

The first flange and the second flange of the flange connection are connected by connection means. Bolts are used as connection means. The bolts are arranged in holes in the first flange and the second flange.

The holes for the connection means are mainly evenly distributed along a circle in the first flange and the second flange for an even transfer of the axial forces, the rotational forces and the tilting moments over the flange connection.

Thus the holes for the connection means forms a circle of holes in the surface of the first flange and the second flange. The holes for the shear pins are arranged radially outward of the circle of holes of the connection means.

Thus the circle of holes for the shear pins show a larger radius than the circle of holes for the connection means. The bigger radius of the circle of holes of the shear pins leads to a longer lever for the shear pins to transfer rotational forces from the first flange to the second flange.

Thus the transfer forces by the shear pins is optimized.

The flange connection comprises a circle of holes that are arranged and prepared in a way to receive the connection means and that the shear pins are arranged radially inward of the circle of holes.

The first flange and the second flange of the flange connection are connected by connection means. Preferably bolts are used as connection means. The bolts are arranged in holes in the first flange and the second flange. The holes for the connection means are mainly evenly distributed along a circle in the first flange and the second flange for an even transfer of the axial forces, the rotational forces and the tilting moments over the flange connection.

Thus the holes for the connection means form a circle of holes in the surface of the first flange and the second flange.

The holes for the shear pins are arranged radially inward of the circle of holes of the connection means.

Thus the circle of holes for the shear pins show a smaller radius than the circle of holes for the connection means.

Thus the shear pins are located in an area of the surface of the flange connection where fewer forces are present. Thus the area of the surface with fewer forces is penetrated by the holes for the shear pins.

In addition, the shear pins can be arranged in two circles. A first circle is arranged radially outwardly of the circle of holes for the connection means. The second circle is arranged radially inwardly of the circle of holes for the connection means.

Thus the holes for the connection means and the holes for the shear pins are more evenly distributed in the area of the surface of the flange connection. Thus there are no spots with a high density of holes in the surface of the flange.

Thus the flange connection shows a more even distribution of material and therefore a more even ability to transfer forces.

Thus no weak areas, with a high density of holes, are present along the surface of the flange that might experience fatigue damages due to constant changing forces induced by the wind during operation of the wind turbine.

The flange connection comprises a circle of holes that are arranged and prepared in a way to receive the connection means and that the shear pins are arranged between the holes.

Thus the holes for the shear pins are arranged in a circle of holes with the same diameter than the circle of holes for the connection means.

Thus the width of the surface of the first flange and the second flange can be optimized.

The connection means are bolts.

Bolts are used to connect the first flange and the second flange in the flange connection.

A wind turbine comprises a flange connection as disclosed.

A hub of a wind turbine comprises a flange that is prepared and arranged in a way to be connected to a nacelle of a wind turbine. The flange comprises a plurality of first holes that are prepared and arranged in a way to interact with connection means be used to connect a hub to the nacelle.

The flange comprises a plurality of second holes that are prepared and arranged in a way to contain shear pins, to be used to transfer rotational forces from the hub to the nacelle when the hub is connected to the nacelle.

The shear pins assist to transfer rotational forces from the hub to the nacelle when the hub is connected to the nacelle.

Thus the transfer of rotational forces from the hub to the nacelle is optimized.

A nacelle of a wind turbine comprises a flange that is prepared and arranged in a way to be connected to a hub of a wind turbine.

The flange comprises a plurality of first holes that are prepared and arranged in a way to interact with connection means being used to connect the nacelle to the hub. The flange comprises a plurality of second holes that are prepared and arranged in a way to interact with shear pins to be used to transfer rotational forces from the hub to the nacelle, when the nacelle is connected to the hub.

During the operation of the wind turbine axial forces, rotational forces and tilting moments are transferred from the hub of the wind turbine to the nacelle.

The shear pins assist to transfer rotational forces from the hub to the nacelle.

Thus the shear pins support the transfer of rotational forces. Thus the transfer of rotational forces is optimized.

BRIEF DESCRIPTION

The embodiments of the invention are shown in more detail by the help of figures. The figures show configurations and do not limit the scope of the invention, wherein.

DETAILED DESCRIPTION

Figure 1:
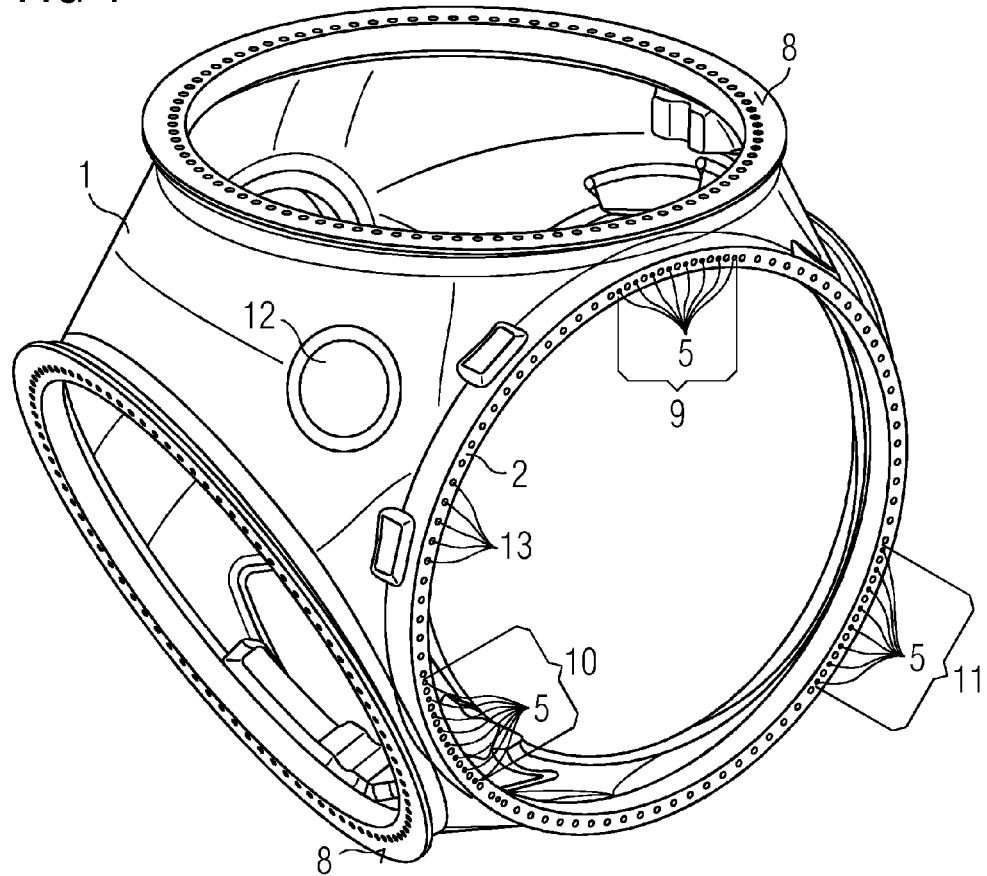
FIG. 1 shows a perspective view of an embodiment a hub of a wind turbine.

FIG. 1 shows a hub 1 of a wind turbine. The hub 1 comprises a flange 2 that is used to connect the hub 1 to the nacelle.

The flange 2 comprises holes 13. The holes 13 are used with connection means 4 like bolts to connect the hub 1 to the nacelle. The flange 2 comprises holes 5 for shear pins 7. The hub 1 comprises connection areas 8 to connect rotor blades to the hub 1.

The wind interacts with the rotor blades and causes a rotation of the hub 1. The rotation of the hub 1 is transferred via the flange connection to the nacelle. Thus axial forces, rotational forces, and tilting moments are transferred over the flange connection.

The shear pins 7 are arranged in the holes 5 of the flange 2. The shear pins 7 transfer rotational forces from the first flange 2 of the hub 1 to the second flange 3 of the nacelle.

The hub 1 comprises man holes 12 for maintenance service. The hub 1 shows a lower stiffness, or high gradient in the stiffness, close to the connection areas 8 or the man holes 12.

In FIG. 1, the holes 5 for the shear pins 7 are arranged in three sectors 9, 10, 11 along the first flange 2 close to the area 8 for the connection of the rotor blade. Thus the shear pins 7 are arranged in an area with a lower stiffness of the hub 1.

Figure 2:
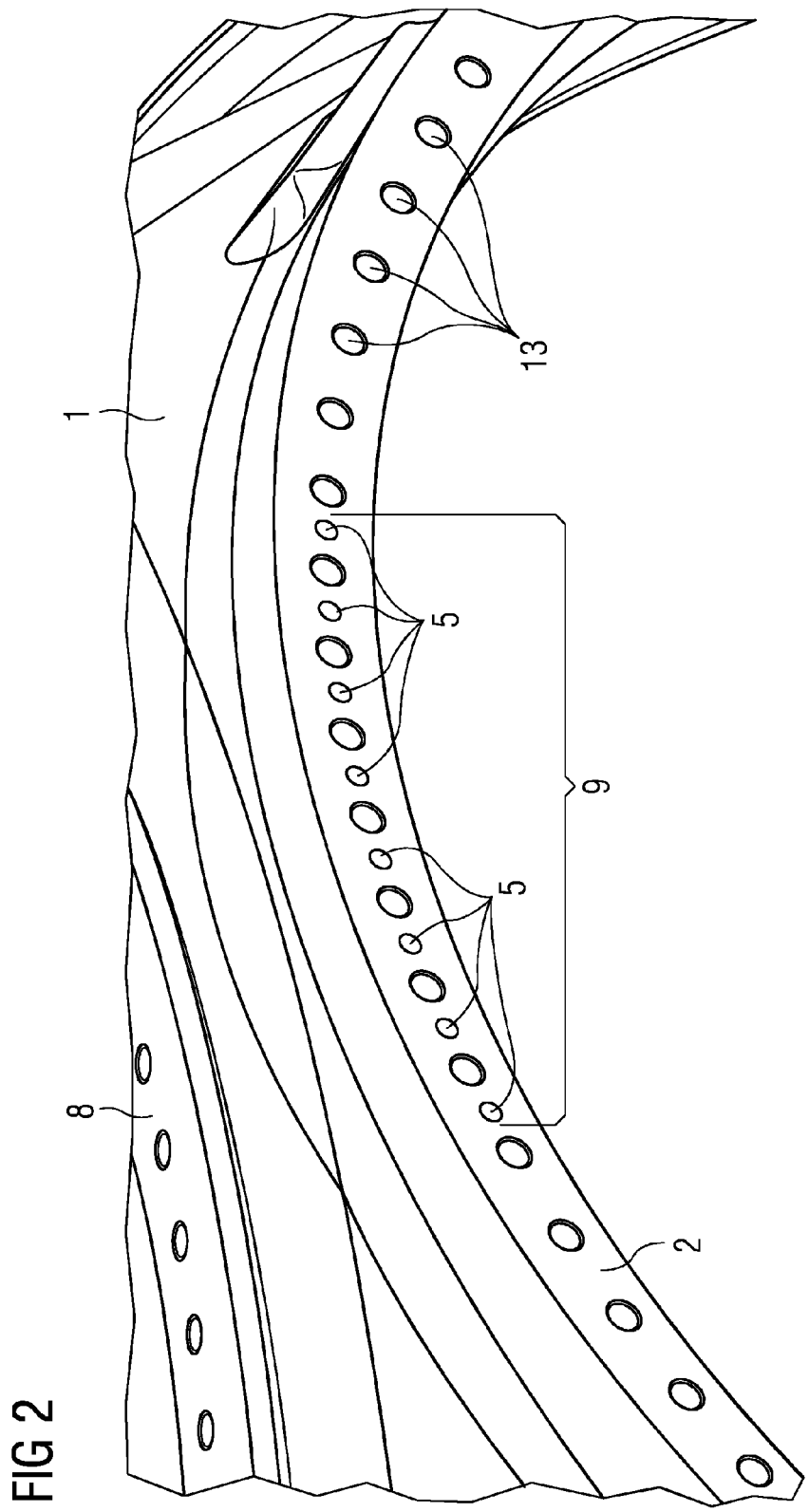
FIG. 2 shows a detailed view of an embodiment of the hub.

FIG. 2 shows a detail of the hub.

FIG. 2 shows a detail of the hub 1. The hub 1 comprises a connection area 8 to connect a rotor blade to the hub 1. The hub 1 comprises a first flange 2 to connect the hub 1 to a nacelle.

The first flange 2 comprises holes 13 to be used by bolts 4. The first flange 2 comprises holes 5 to be used with shear pins 7. The holes 5 are arranged in a sector 9 that is close to the connection area 8 for connecting the rotor blade to the hub 1.

The holes 13 along the first flange 2 are arranged as a circle of holes. The holes 5 are arranged between the holes 13.

Figure 3:
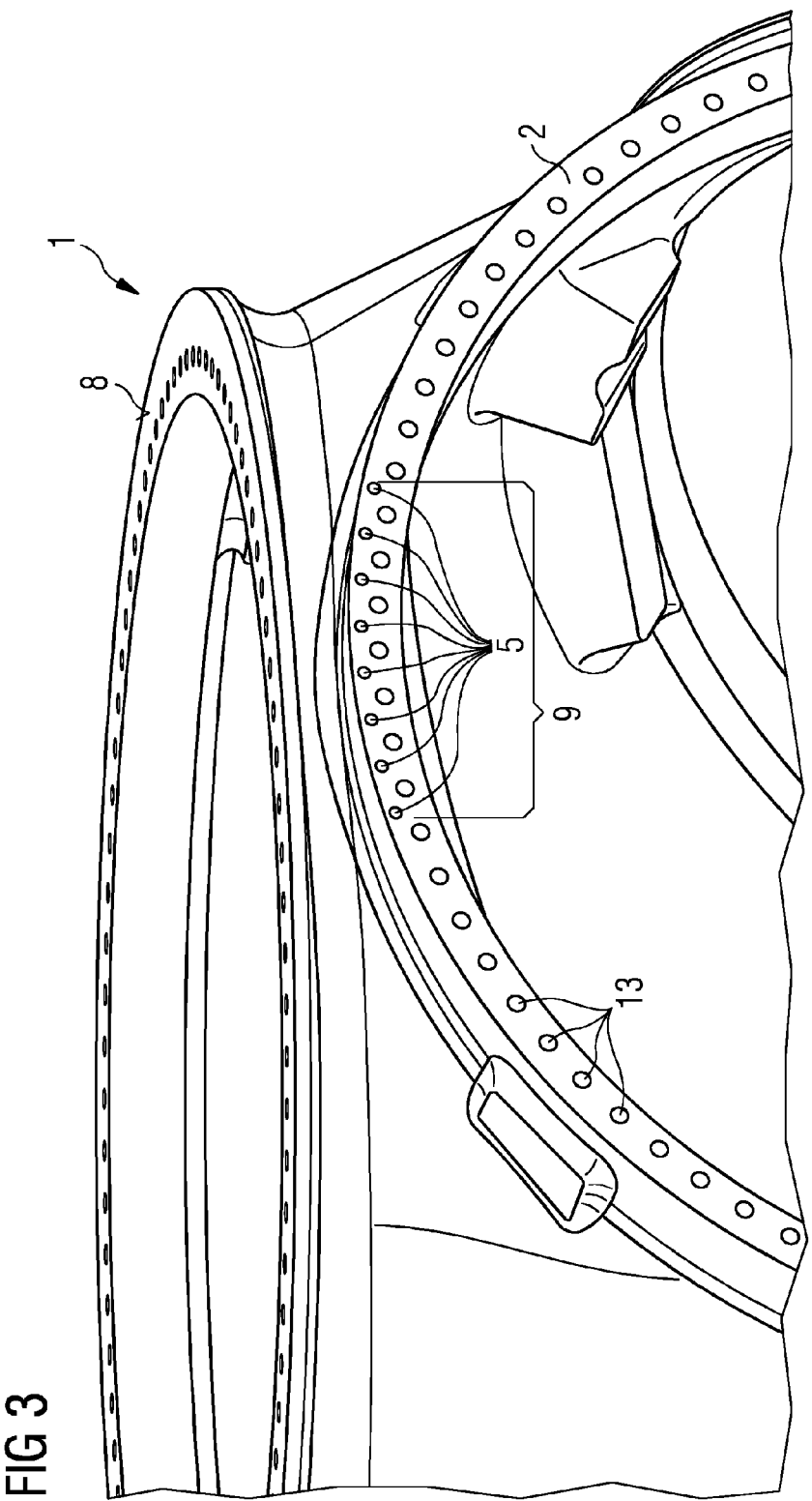
FIG. 3 shows a detailed view of another embodiment of the hub.

FIG. 3 shows another embodiment of the hub.

FIG. 3 shows another embodiment of the hub 1. The hub 1 comprises a connection area 8 to connect a rotor blade to the hub 1. The hub 1 comprises a first flange 2 to connect the hub to a nacelle of a wind turbine. The first flange 2 comprises a circle of holes 13. The holes 13 are used with bolts 4 to connect the hub 1 of the wind turbine to the nacelle. The first flange 2 comprises holes 5 to be used with shear pins 7.

The holes 5 are arranged in a sector 9 that is closed to the connection area 8 to connect a rotor blade to the hub 1. The holes 13 are arranged in a circle along the surface of the first flange 2. The holes 5 are arranged in the surface of the first flange 2 radially outward of the circle of holes 13.

Figure 4:
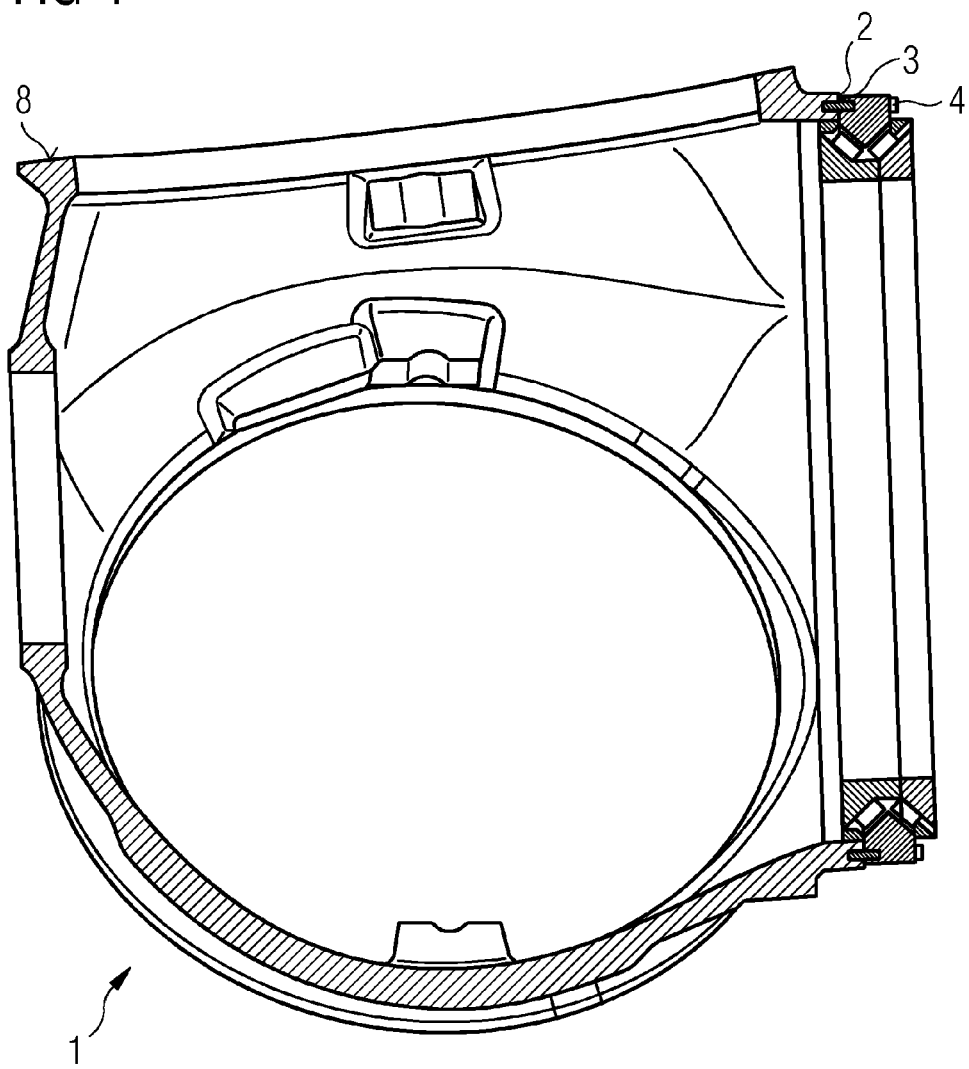
FIG. 4 shows a cut-through view of an embodiment of a hub.

FIG. 4 shows a cut through a hub.

FIG. 4 shows a cut through a hub 1. The hub 1 comprises a connection area 8 to connect a rotor blade to the hub. The hub 1 comprises a first flange 2 to connect the hub 1 to the nacelle. The nacelle comprises a second flange 3 that is connected to the first flange 2 by bolts 4.

Figure 5:
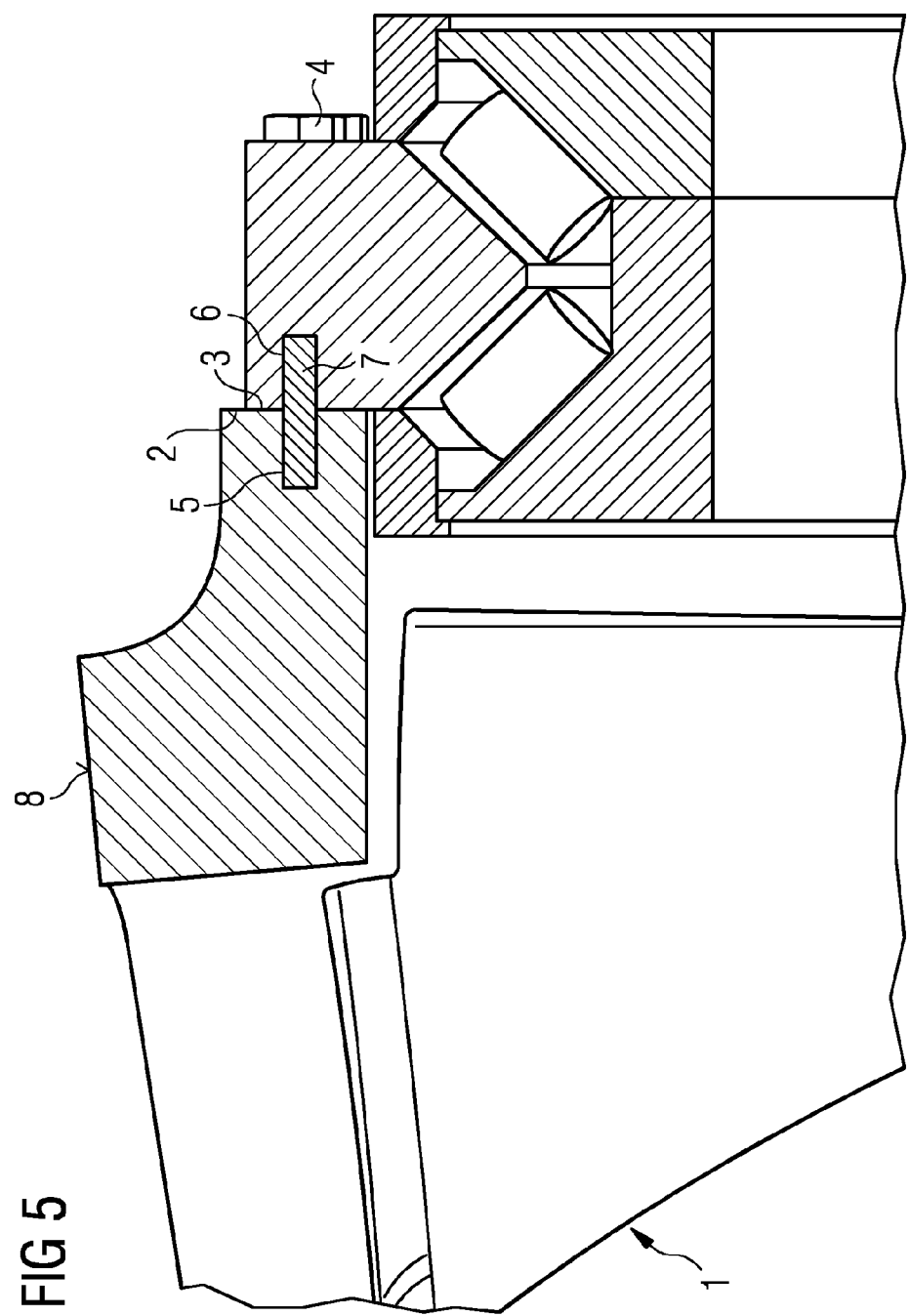
FIG. 5 shows a detailed view of an embodiment of a flange connection.

FIG. 5 shows a detail of a flange connection.

FIG. 5 shows a detail of a flange connection according to FIG. 4. A hub 1 comprises a connection area 8 to connect a rotor blade to the hub 1.

The hub 1 comprises a first flange 2 to connect to a second flange 3 of a nacelle. The first flange 2 and the second flange 3 are connected by bolts 4.

The first flange 2 comprises holes 5. The second flange 3 comprises holes 6. The holes 5, 6 are blind holes. The blind holes 5, 6 comprise a shear pin 7.

The wind interacts with a rotor blade and rotates the hub 1. The rotation of the hub 1 is transferred via the flange connection of the first flange 2 and a second flange 3 to the nacelle of the wind turbine. The flange connection transfers axial forces, radial forces and tilting moments from the hub 1 to the nacelle. The shear pins 7 transfer rotational forces from the hub 1 to the nacelle.

Figure 6:
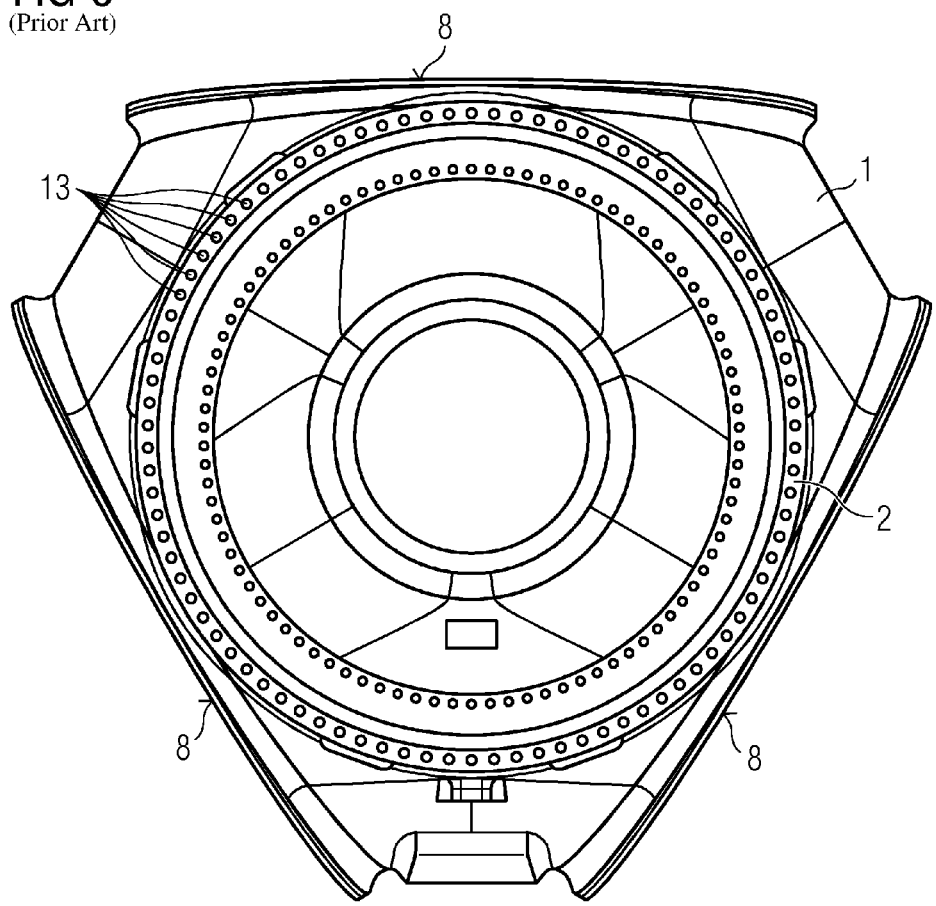
FIG. 6 shows a flange of the prior art.

FIG. 6 shows a flange of the prior art.

FIG. 6 shows a flange of a hub 1 of the prior art. The hub 1 comprises three connection areas 8 to connect rotor blades to the hub. The hub 1 comprises a flange 2 to connect a hub 1 to a nacelle. A flange 2 comprises a circle of holes 13 that are used to connect the hub 1 to the nacelle with bolts.

The wind interacts with the rotor blades and rotates the hub 1. The rotation is transferred from the hub 1 to the nacelle. The bolts through the holes 13 transfer axial forces, radial forces and tilting moments from the hub 1 to the nacelle.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A wind turbine flange connection between a hub of a wind turbine and a nacelle of the wind turbine,
   wherein the hub comprises a first flange,
   wherein the nacelle comprises a second flange,
   wherein the first flange and the second flange are connected to each other by a number of connection means to transfer forces between the first flange and the second flange, and
   wherein the first flange comprises a plurality of holes and the second flange comprises a plurality of holes corresponding to the plurality of holes in the first flange,
   wherein the plurality of holes of the first and second flange are arranged in the first and second flange based upon the axial, rotational and tilting forces between the hub and nacelle; and
   a plurality of shear pins arranged in the plurality of holes.

2. The wind turbine flange connection according to claim 1, wherein the plurality of holes in the first flange and/or the plurality of holes in the second flange to accommodate the plurality of shear pins are blind holes.

3. The wind turbine flange connection according to claim 1, wherein the plurality of shear pins are at least arranged in a sector along the first flange where the hub shows a lower stiffness or a high gradient in the stiffness.

4. The wind turbine flange connection according to claim 1, wherein the hub comprises a connection area that is prepared to receive a rotor blade and that the plurality of shear pins are arranged in a sector along the first flange adjacent to the connection area for the connection of a rotor blade.

5. The wind turbine flange connection according to claim 1, wherein the hub comprises an opening for service and maintenance purpose and that the shear pins are arranged in a sector along the first flange proximate an area of the opening.

6. The wind turbine flange connection according to claim 1, wherein the shear pins are arranged in an area of the first flange adjacent to a man hole in the hub.

7. The wind turbine flange connection according to claim 1, wherein the plurality of shear pins are located in three sectors along a circumference of the first flange, which each cover up to one sixth of the circumference of the first flange.

8. The wind turbine flange connection according to claim 1, wherein the plurality of shear pins are mainly evenly distributed along a circumference of the first flange.

9. The wind turbine flange connection according to claim 1, wherein the flange connection comprises a circle of holes that are arranged and prepared in a way to receive the connection means and that the plurality of shear pins are arranged radially outward of the circle of holes.

10. The wind turbine flange connection according to claim 1, wherein the flange connection comprises a circle of holes that are arranged and prepared in a way to receive the connection means and that the plurality of shear pins are arranged radially inward of the circle of holes.

11. The wind turbine flange connection according to claim 1, wherein the flange connection comprises a circle of holes that are arranged and prepared in a way to receive the connection means and that the plurality of shear pins are arranged between the holes.

12. The wind turbine flange connection according to claim 1, wherein the connection means are bolts.

13. The wind turbine comprising a flange connection according to claim 1.

14. A hub of a wind turbine comprising a flange that is prepared and arranged in a way to be connected to a nacelle of a wind turbine,
   wherein the flange comprises a plurality of first holes that are prepared and arranged in a way to interact with a connection means being used to connect the hub to the nacelle, wherein the flange comprises a plurality of second holes that are prepared and arranged in a way to contain a plurality of shear pins to be used to transfer rotational, axial and tilting forces from the hub to the nacelle when the hub is connected to the nacelle.

15. A nacelle of a wind turbine comprising a flange that is prepared and arranged in a way to be connected to a hub of a wind turbine, wherein the flange includes a plurality of first holes that are prepared and arranged in a way to interact with a connection means being used to connect the nacelle to the hub, wherein the flange includes a plurality of second holes that are prepared and arranged in a way to interact with a plurality of shear pins to be used to transfer rotational, axial and tilting forces from the hub to the nacelle when the nacelle is connected to the hub.

16. The wind turbine flange connection according to claim 1, wherein the flange on the hub is outwardly extending from a body of the hub.

* * * * *